(12) United States Patent
Wang

(10) Patent No.: US 11,254,088 B2
(45) Date of Patent: Feb. 22, 2022

(54) COVER, DISPLAY PANEL, AND COVER MANUFACTURING METHOD

(71) Applicant: TCL CHINA STAR OPTOELECTRONICS TECHNOLOGY CO., LTD., Guangdong (CN)

(72) Inventor: Guojie Wang, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/618,808

(22) PCT Filed: Nov. 13, 2019

(86) PCT No.: PCT/CN2019/117881
§ 371 (c)(1),
(2) Date: Dec. 3, 2019

(87) PCT Pub. No.: WO2021/056744
PCT Pub. Date: Apr. 1, 2021

(65) Prior Publication Data
US 2021/0094256 A1 Apr. 1, 2021

(30) Foreign Application Priority Data
Sep. 27, 2019 (CN) .......................... 201910922576.6

(51) Int. Cl.
*B32B 3/26* (2006.01)
*B32B 17/06* (2006.01)

(52) U.S. Cl.
CPC .............. *B32B 3/266* (2013.01); *B32B 17/06* (2013.01); *B32B 2457/20* (2013.01)

(58) Field of Classification Search
CPC . B32B 2457/20; B32B 3/266; B32B 17/1055; Y10T 156/12; Y10T 156/1056; B28D 1/14
See application file for complete search history.

(56) References Cited

U.S. PATENT DOCUMENTS

| | | | | |
|---|---|---|---|---|
| 2014/0034226 | A1* | 2/2014 | Shan | B29D 11/00 156/248 |
| 2017/0289324 | A1* | 10/2017 | Yeo | G03B 29/00 |
| 2020/0106054 | A1* | 4/2020 | Boroson | H01L 51/524 |

FOREIGN PATENT DOCUMENTS

| | | |
|---|---|---|
| CN | 102702547 A | 10/2012 |
| CN | 104690615 A * | 6/2015 |

(Continued)

OTHER PUBLICATIONS https://www.merriam-webster.com/dictionary/surround accessed Aug. 4, 2021.*

*Primary Examiner* — Alicia J Sawdon
(74) *Attorney, Agent, or Firm* — Mark M. Friedman

(57) ABSTRACT

A cover, a display panel, and a cover manufacturing method are provided. The cover includes a glass cover, and the glass cover includes a boring area. An encapsulation layer is disposed on a side of the glass cover, and a buffer layer is disposed on the side of the glass cover away from the encapsulation layer. The buffer layer is disposed on the glass cover corresponding to the boring area, and the buffer layer is configured to buffer stress generated in the encapsulation layer when a hole is drilled in the boring area.

8 Claims, 2 Drawing Sheets

(56) References Cited

FOREIGN PATENT DOCUMENTS

| | | | |
|---|---|---|---|
| CN | 104690615 A | | 6/2015 |
| CN | 206465361 U | | 9/2017 |
| CN | 109904118 A | | 6/2019 |
| JP | 2009256113 A | * | 11/2009 |
| KR | 20170080115 A | | 7/2017 |

* cited by examiner

COVER, DISPLAY PANEL, AND COVER MANUFACTURING METHOD

FIELD OF INVENTION

The present invention relates to the field of display technologies, and in particular, to a cover, a display panel, and a method of manufacturing the cover.

BACKGROUND OF INVENTION

With development of display panel technologies, display devices with a high screen-to-body ratio have become more and more popular.

Present display devices generally use a boring technique to achieve a high screen-to-body ratio. Since present display devices are generally packaged with glass glue, and the glass glue belongs to a ceramic material and has high brittleness, when a hole is bored into screens of mobile phones, the generated stress may cause cracks in the glass glue, which results a decrease in yield of mobile phones.

SUMMARY OF INVENTION

It is an object of the present invention to provide a cover, a display panel, and a method of manufacturing the cover, which improves yield of the cover.

Embodiments of the present invention provide a cover, including:

a glass cover including a boring area;

an encapsulation layer disposed on a side of the glass cover; and a buffer layer disposed on a side of the glass cover away from the encapsulation layer, wherein the buffer layer is disposed on the glass cover corresponding to the boring area, the buffer layer is configured to buffer stress generated in the encapsulation layer when a hole is drilled in the boring area.

In an embodiment, a constituent material of the buffer layer includes a glue.

In an embodiment, the glue includes a polymer glue material or a photosensitive glue.

In an embodiment, the polymer glue material is selected from one or more of ethyl cellulose, hydroxyethyl cellulose, cellulose acetate, and cellulose acetate butyrate.

In an embodiment, a constituent material of the buffer layer includes one or more of epoxy acrylate, polyetherimide, polymethyl methacrylate, polyethylene terephthalate, urethane acrylate, polyether acrylate, polyester acrylate, acrylic resin, polyacrylic acid, sodium polyacrylate, polyethyleneimine, polyvinyl alcohol, polytetrahydrofuran, poly (1,4-butanediol succinate), and polyvinylpyrrolidone.

In an embodiment, the buffer layer completely covers the boring area or the buffer layer partially covers the boring area.

In an embodiment, the encapsulation layer includes a first encapsulation layer disposed around the boring area and a second encapsulation layer disposed around a periphery of the glass cover.

In an embodiment, a height of the buffer layer is greater than or equal to a height of the first encapsulation layer.

An embodiment of the present invention further provides a display panel, including a substrate and a cover;

the cover including:

a glass cover including a boring area;

an encapsulation layer disposed on a side of the glass cover;

a buffer layer disposed on a side of the glass cover away from the encapsulation layer, wherein the buffer layer is disposed on the glass cover corresponding to the boring area, the buffer layer is configured to buffer stress generated in the encapsulation layer when a hole is drilled in the boring area, the substrate and the cover are disposed opposite to each other, the substrate and the cover are secured together by the encapsulation layer.

In an embodiment, a constituent material of the buffer layer includes a glue.

In an embodiment, the glue includes a polymer glue material or a photosensitive glue.

In an embodiment, the polymer glue material is selected from one or more of ethyl cellulose, hydroxyethyl cellulose, cellulose acetate, and cellulose acetate butyrate.

In an embodiment, a constituent material of the buffer layer includes one or more of epoxy acrylate, polyetherimide, polymethyl methacrylate, polyethylene terephthalate, urethane acrylate, polyether acrylate, polyester acrylate, acrylic resin, polyacrylic acid, sodium polyacrylate, polyethyleneimine, polyvinyl alcohol, polytetrahydrofuran, poly (1,4-butanediol succinate), and polyvinylpyrrolidone.

In an embodiment, the buffer layer completely covers the boring area, or the buffer layer partially covers the boring area.

In an embodiment, the encapsulation layer includes a first encapsulation layer disposed around the boring area and a second encapsulation layer disposed around a periphery of the glass cover.

In an embodiment, a height of the buffer layer is greater than or equal to a height of the first encapsulation layer.

In an embodiment, the display panel further including a fixed layer disposed between the substrate and the encapsulation layer.

Further, an embodiment of the present invention further provides a method of manufacturing a cover, including:

providing a glass cover, the glass cover including a boring area;

forming an encapsulation layer on a side of the glass cover; and forming a buffer layer on a side of the glass cover away from the encapsulation layer, and disposing the buffer layer on the glass cover corresponding to the boring area, wherein the buffer layer is configured to buffer stress generated in the encapsulation layer when a hole is drilled in the boring area.

In an embodiment, the step of forming the buffer layer on the side of the glass cover away from the encapsulation layer and disposing the buffer layer on the glass cover corresponding to the boring area, the buffer layer configured to buffer stress generated in the encapsulation layer when a hole is drilled in the boring area, includes:

forming the buffer layer on the side of the glass cover away from the encapsulation layer by dispensing or screen printing.

The cover, the display panel, and the method of manufacturing the cover, which discloses by embodiments of the invention are provided with a buffer layer on the boring area of the glass cover, thereby reducing the stress on the encapsulation layer when a hole is drilled in the boring area, and improving yield of the cover.

In order to make above-mentioned contents of the present invention more comprehensible, the preferred embodiments are described below, and in conjunction with the accompanying drawings.

DETAILED DESCRIPTION OF EMBODIMENTS

Figure 1:
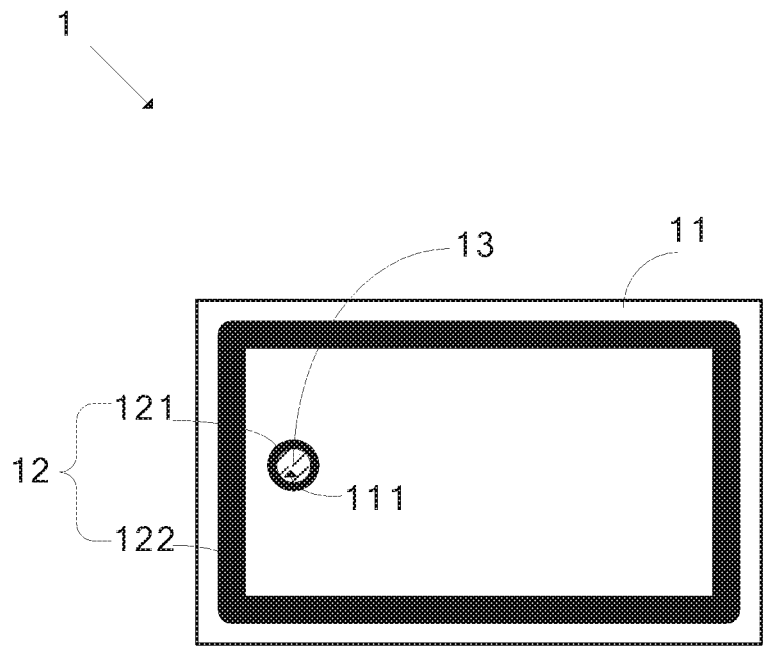
FIG. 1 is a schematic structural diagram of a cover according to an embodiment of the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

In the drawings, components having similar structures are denoted by the same numerals.

References to "an embodiment" herein mean that a specific feature, structure, or characteristic described in connection with the embodiments can be included in at least one embodiment of the invention. The appearances of the phrases in various places in the specification are not necessarily referring to the same embodiments, and are not exclusive or alternative embodiments that are mutually exclusive. Those skilled in the art will explicitly and implicitly understand that the embodiments described herein can be combined with other embodiments.

Embodiments of the present invention provide a display panel including a cover and a substrate disposed opposite to each other to form a storage space for accommodating components on the substrate.

The substrate can be a rigid substrate or a flexible substrate. A structure such as a thin film transistor layer, an electroluminescence device layer, or the like is provided on the substrate.

Please refer to FIG. 1, FIG. 1 is a schematic structural view of a cover according to an embodiment of the present invention. The cover 1 includes a glass cover 11, an encapsulation layer 12, and a buffer layer 13.

As shown in FIG. 1, the glass cover 11 includes a boring area 111. A photosensor, a camera, and the like are disposed below the boring area 111.

A constituent material of the encapsulation layer 12 includes glass glue. The encapsulation layer 12 is disposed on a side of the glass cover 11. Specifically, when the cover 1 and the substrate are assembled, the encapsulation layer 12 is disposed between the glass cover 11 and the substrate for protecting components accommodated in the storage space between the glass cover 11 and the substrate from corrosion by external water and oxygen.

As shown in FIG. 1, the encapsulation layer 12 can include a first encapsulation layer 121 and a second encapsulation layer 122. The first encapsulation layer 121 is disposed around the boring area 111, and the second encapsulation layer 122 is disposed around the periphery of the glass cover 11. A height and a width of the first encapsulation layer 121 and the second encapsulation layer 122 can be same or different. Specifically, the heights of the first encapsulation layer 121 and the second encapsulation layer 122 range between five and six microns. The first encapsulation layer 121 and the second encapsulation layer 122 have widths ranging between 300 and 400 microns.

The buffer layer 13 is disposed on the side of the glass cover 11 away from the encapsulation layer 12, and the buffer layer 13 is disposed on the glass cover 11 corresponding to the boring area 111. The buffer layer 13 is configured to buffer stress generated in the encapsulation layer 12 when a hole is drilled in the boring area 111.

The buffer layer 13 can completely cover the boring area 111 or partially cover the boring area. In an embodiment, when an aperture area of the boring area 111 is large, if the buffer layer 13 completely covers the boring area 111, more material of buffer layer is needed; therefore, the buffer layer 13 can partially cover the boring area 111 to save resources. For example, when the cover 1 is applied to smart phones, the aperture area of the boring area is larger, generally between three and four millimeters (mm). Under this situation, the buffer layer 13 can partially cover the boring area 111. In an embodiment, when the cover 1 is applied to a precision instrument such as a precision camera, the aperture area of the boring area 111 is smaller, generally between 0.5 and 1.5 mm. Under this situation, the buffer layer 13 can completely cover the boring area 111, so that the buffer layer 13 has a sufficiently large buffer area to improve the buffering effect.

In an embodiment, a height of the buffer layer 13 is greater than or equal to a height of the first encapsulation layer 121. Thus, when the boring area 111 is punctured, the buffer layer 13 can absorb enough stress of the first encapsulation layer 121 positioned below the boring area 111.

In an embodiment, a constituent material of the buffer layer 13 includes a glue. The glue can be a polymer glue material or a photosensitive glue. Specifically, the polymer glue material includes one or more of ethyl cellulose, hydroxyethyl cellulose, cellulose acetate, and cellulose acetate butyrate. Among them, the polymer glue material has a large molecular weight and can provide a greater cushioning force. Furthermore, the buffer layer 13 can be formed by selecting glue materials of different molecular weights according to different buffering force requirements.

It should be noted that, since the glue material has fluidity and adhesiveness, when the boring area 111 is drilled, the glue material on the buffer layer 13 flows into a formed through hole, and a protective layer made of the glue material is formed inside the first encapsulation layer 121 to prevent corrosion by external water and oxygen.

In an embodiment, the buffer layer 13 can also be consisted of other materials having cushioning properties. Specifically, a constituent material of the buffer layer 13 includes one or more of epoxy acrylate, polyetherimide, polymethyl methacrylate, polyethylene terephthalate, urethane acrylate, polyether acrylate, polyester acrylate, acrylic resin, polyacrylic acid, sodium polyacrylate, polyethyleneimine, polyvinyl alcohol, polytetrahydrofuran, poly(1,4-butanediol succinate), and polyvinylpyrrolidone.

In an embodiment, in order to improve adhesive performance between a substrate 2 and the encapsulation layer 12, a fixed layer can be disposed at a position opposite to the substrate 2 and the encapsulation layer 12. Meanwhile, a constituent material of the fixed layer includes silicon nitride or silicon oxide. The fixed layer is provided in a hollow shape to improve the adhesion between the substrate 2 and the encapsulating layer 12.

Figure 2:
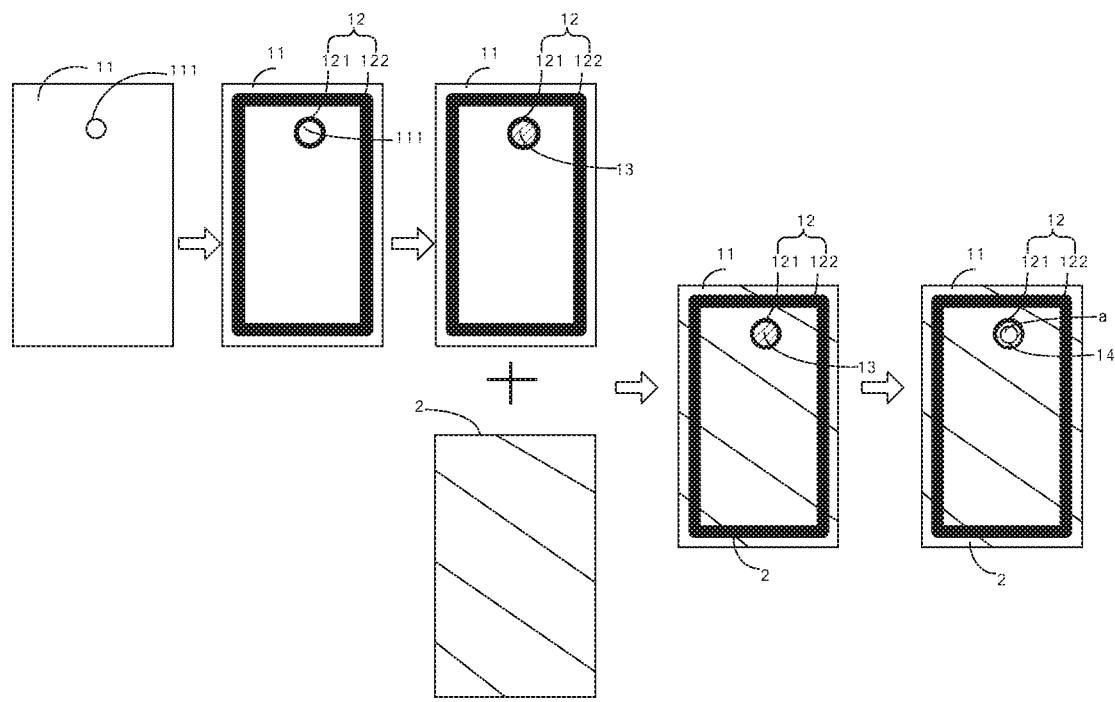
FIG. 2 is a schematic diagram of a scene in which a substrate and the cover are assembled into a display panel according to an embodiment of the present invention.

Please refer to FIG. 2, FIG. 2 is a schematic diagram of a scene in which the cover and the substrate are assembled into a display panel according to an embodiment of the present invention. The assembly process of the cover and the substrate will be described in detail below with reference to FIG. 2.

First, the glass cover 11 is provided, which includes the boring area 111. The encapsulation layer 12 is formed on one side of the glass cover 11. Specifically, the encapsulation layer 12 can include the first encapsulation layer 121 and the second encapsulation layer 122. The first encapsulation layer 121 is disposed around the boring area 111, and the second encapsulation layer 122 is disposed around the periphery of the glass cover 11. The buffer layer 13 is formed on the side of the glass cover 11 away from the encapsulation layer 12, and the buffer layer 13 is disposed on the glass cover 11 corresponding to the boring area 111.

The substrate 2 is provided, and the substrate 2 includes the thin film transistor layer, the electroluminescent device layer, and the like.

Then, the cover 1 and the substrate 2 are aligned and bonded, and the glass glue in the first encapsulation layer 121 and the second encapsulation layer 122 is melted by laser to bond the cover 1 and the substrate 2 together.

Finally, the boring area 111 on the glass cover 11 is drilled, and the buffer layer 13 serves as a buffering effect to alleviate influence of stress generated in the drilling on the encapsulation layer 12.

It should be noted that when the constituent material of the buffer layer 13 is a glue material, since the glue material has fluidity and adhesiveness, when the boring area 111 is drilled, the glue material on the buffer layer 13 flows into a formed through hole a, and a protective layer 14 made of the glue material is formed inside the first encapsulation layer 121 to prevent corrosion by external water and oxygen.

Figure 3:
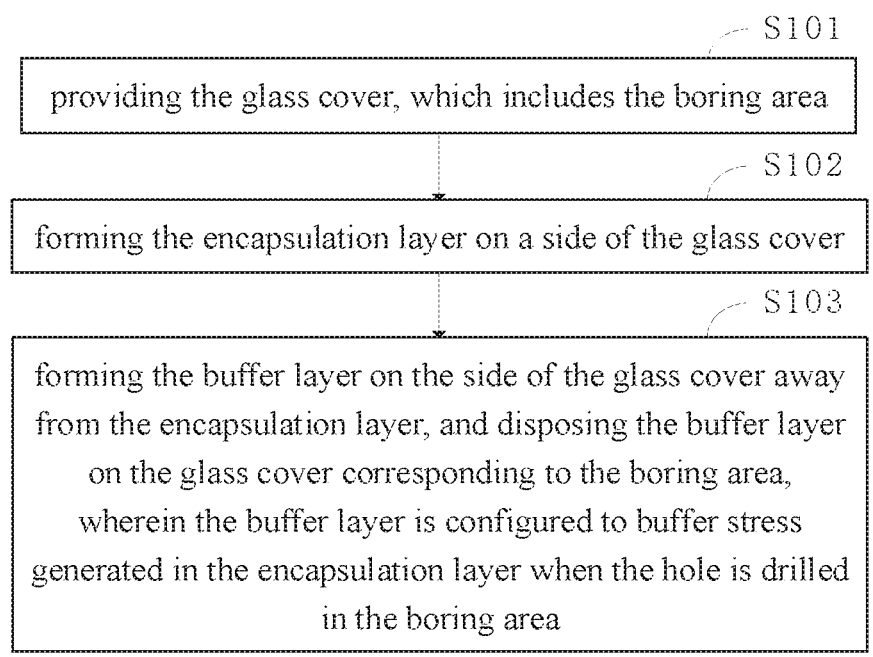
FIG. 3 is a schematic flowchart of a method of manufacturing the cover according to an embodiment of the present invention.

An embodiment of the invention also provides a method of manufacturing the cover. Please refer to FIG. 3, FIG. 3 is a schematic flowchart of the method of manufacturing the cover according to an embodiment of the present invention. The manufacturing method of the cover includes:

a step S101, providing a glass cover, which includes a boring area.

Referring to FIGS. 1 and 2, the glass cover 11 includes the boring area 111. A photosensor, a camera, and the like are disposed below the boring area 111.

A step S102, forming an encapsulation layer on a side of the glass cover.

The constituent material of the encapsulation layer 12 includes glass glue. The encapsulation layer 12 is disposed on the side of the glass cover 11. Specifically, when the cover 1 and the substrate are assembled, the encapsulation layer 12 is disposed between the glass cover 11 and the substrate for protecting components accommodated in the storage space between the glass cover 11 and the substrate from corrosion by external water and oxygen.

As shown in FIG. 1, the encapsulation layer 12 can include the first encapsulation layer 121 and the second encapsulation layer 122. The first encapsulation layer 121 is disposed around the boring area 111, and the second encapsulation layer 122 is disposed around the periphery of the glass cover 11. The height and width of the first encapsulation layer 121 and the second encapsulation layer 122 can be same or different. Specifically, the heights of the first encapsulation layer 121 and the second encapsulation layer 122 range between five and six microns. The first encapsulation layer 121 and the second encapsulation layer 122 have widths ranging between 300 and 400 microns.

A step S103, forming a buffer layer on the side of the glass cover away from the encapsulation layer, and disposing the buffer layer on the glass cover corresponding to the boring area, wherein the buffer layer is configured to buffer stress generated in the encapsulation layer when the hole is drilled in the boring area.

In an embodiment, the buffer layer can be formed by dispensing or screen printing. Specifically, when an area of the boring area 111 is large, for example, a hole diameter of the boring area 111 is between three and four millimeters, the dispensing method can be employed. When the area of the boring area 111 is small, for example, the hole diameter of the boring area 111 is between 0.5 and 1.5 mm, screen printing can be employed.

The buffer layer 13 is disposed on the side of the glass cover 11 away from the encapsulation layer 12, and the buffer layer 13 is disposed on the glass cover 11 corresponding to the boring area 111. The buffer layer 13 is configured to buffer the stress generated in the encapsulation layer 12 when the hole is drilled in the boring area 111.

The buffer layer 13 can completely cover the boring area 111 or partially cover the boring area. In an embodiment, when the aperture area of the boring area 111 is large, if the buffer layer 13 completely covers the boring area 111, more material of the buffer layer is needed; therefore, the buffer layer 13 can partially cover the boring area 111 to save resources. For example, when the cover 1 is applied to smart phones, the aperture area of the boring area is larger, generally between three and four millimeters. Under this situation, the buffer layer 13 can partially cover the boring area 111. In an embodiment, when the cover 1 is applied to a precision instrument such as a precision camera, the aperture area of the boring area 111 is smaller, generally between 0.5 and 1.5 mm. Under this situation, the buffer layer 13 can completely cover the boring area 111, so that the buffer layer 13 has a sufficiently large buffer area to improve the buffering effect.

In an embodiment, the height of the buffer layer 13 is greater than or equal to the height of the first encapsulation layer 121. Thus, when the boring area 111 is punctured, the buffer layer 13 can absorb enough stress of the first encapsulation layer 12 positioned below the boring area 111.

In an embodiment, the constituent material of the buffer layer 13 includes a glue. The glue can be a polymer glue material or a photosensitive glue. Specifically, the polymer glue material includes one or more of ethyl cellulose, hydroxyethyl cellulose, cellulose acetate, and cellulose acetate butyrate. Among them, the polymer glue material has a large molecular weight and can provide a greater cushioning force. Furthermore, the buffer layer 13 can be formed by selecting glue materials of different molecular weights according to different buffering force requirements.

It should be noted that, since the glue material has fluidity and adhesiveness, after drilling the boring area 111, the glue material on the buffer layer 13 flows into the formed through hole a, and the protective layer 14 made of the glue material is formed inside the first encapsulation layer 121 to prevent corrosion by external water and oxygen.

The cover, the display panel, and the cover manufacturing method of the embodiment of the invention are provided with the buffer layer on the glass cover corresponding to the boring area, thereby reducing stress of the encapsulation layer when a hole is drilled in the boring area, and improving yield of the cover.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising a substrate and a cover, the cover comprising:

a glass cover comprising a boring area;

an encapsulation layer disposed on a side of the glass cover; and a buffer layer disposed on a side of the glass cover away from the encapsulation layer, wherein the buffer layer is disposed on the glass cover corresponding to the boring area, the buffer layer is configured to buffer stress generated in the encapsulation layer when a hole is drilled in the boring area, the substrate and the cover are disposed opposite to each other, and the substrate and the cover are secured together by the encapsulation layer; and wherein the encapsulation layer comprises a first encapsulation layer encircling a top surface of the boring area and a second encapsulation layer encircling a top surface of a periphery of the glass cover, and a top surface of the glass cover between the first encapsulation layer and the second encapsulation layer is exposed.

2. The display panel according to claim 1, wherein a constituent material of the buffer layer comprises a glue.

3. The display panel according to claim 2, wherein the glue comprises a polymer glue material or a photosensitive glue.

4. The display panel according to claim 3, wherein the polymer glue material is selected from one or more of ethyl cellulose, hydroxyethyl cellulose, cellulose acetate, and cellulose acetate butyrate.

5. The display panel according to claim 1, wherein a constituent material of the buffer layer comprises one or more of epoxy acrylate, polyetherimide, polymethyl methacrylate, polyethylene terephthalate, urethane acrylate, polyether acrylate, polyester acrylate, acrylic resin, polyacrylic acid, sodium polyacrylate, polyethyleneimine, polyvinyl alcohol, polytetrahydrofuran, poly(1,4-butanediol succinate), and polyvinylpyrrolidone.

6. The display panel according to claim 1, wherein the buffer layer completely covers the boring area, or the buffer layer partially covers the boring area.

7. The display panel according to claim 1, wherein a height of the buffer layer is greater than or equal to a height of the first encapsulation layer.

8. The display panel according to claim 1, further comprising a fixed layer disposed between the substrate and the encapsulation layer.

* * * * *